(12) United States Patent
Nowatari et al.

(10) Patent No.: US 8,079,210 B2
(45) Date of Patent: Dec. 20, 2011

(54) ENGINE

(75) Inventors: Noboru Nowatari, Shizuoka (JP); Hideo Fujita, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 935 days.

(21) Appl. No.: 12/066,056

(22) PCT Filed: Sep. 4, 2006

(86) PCT No.: PCT/JP2006/317428
§ 371 (c)(1),
(2), (4) Date: Mar. 6, 2008

(87) PCT Pub. No.: WO2007/029632
PCT Pub. Date: Mar. 15, 2007

(65) Prior Publication Data
US 2009/0133649 A1 May 28, 2009

(30) Foreign Application Priority Data

Sep. 6, 2005 (JP) .................................. 2005-258322

(51) Int. Cl.
*F01N 3/00* (2006.01)
*F01N 3/10* (2006.01)
(52) U.S. Cl. ................................ 60/285; 60/288; 60/299
(58) Field of Classification Search ..................... 60/285
See application file for complete search history.

(56) References Cited

U.S. PATENT DOCUMENTS

| | | | | |
|---|---|---|---|---|
| 5,203,311 A | * | 4/1993 | Hitomi et al. | 60/605.2 |
| 6,047,542 A | * | 4/2000 | Kinugasa et al. | 60/274 |
| 2005/0126526 A1 | * | 6/2005 | Fujita et al. | 123/90.16 |
| 2005/0268600 A1 | * | 12/2005 | I et al. | 60/288 |
| 2006/0070382 A1 | * | 4/2006 | Karlsson | 60/612 |
| 2006/0137330 A1 | * | 6/2006 | I et al. | 60/288 |

FOREIGN PATENT DOCUMENTS

| | | | |
|---|---|---|---|
| JP | 64-49638 | | 3/1989 |
| JP | 02201007 A | * | 8/1990 |
| JP | 02-259205 | | 10/1990 |
| JP | 03-033410 | | 2/1991 |
| JP | 06200745 A | * | 7/1994 |
| JP | 07-158426 | | 6/1995 |
| JP | 07-166849 | | 6/1995 |
| JP | 07166849 A | * | 6/1995 |
| JP | 10-176523 | | 6/1998 |
| JP | 2005-098279 | | 4/2005 |
| JP | 2005-264787 | | 9/2005 |
| JP | 2006299847 A | * | 11/2006 |
| WO | WO 9958822 A1 | * | 11/1999 |
| WO | WO 03/098012 A1 | | 11/2003 |

\* cited by examiner

*Primary Examiner* — Thomas Denion
*Assistant Examiner* — Jason Shanske
(74) *Attorney, Agent, or Firm* — Keating & Bennett, LLP

(57) ABSTRACT

An engine can include a first catalyst disposed in a first exhaust passage, a second catalyst disposed in a second exhaust passage to be located upstream of the first catalyst, a variable valve operating mechanism configured to make lifting amounts of a first and second exhaust valves variable between approximate zero and maximum, and a lifting amount control unit for controlling the lifting amounts of the first and second exhaust valves with the variable valve operating mechanism such that an exhaust gas amount passing through the second exhaust passage is larger than that passing through the first exhaust passage.

13 Claims, 14 Drawing Sheets

[FIG. 1]
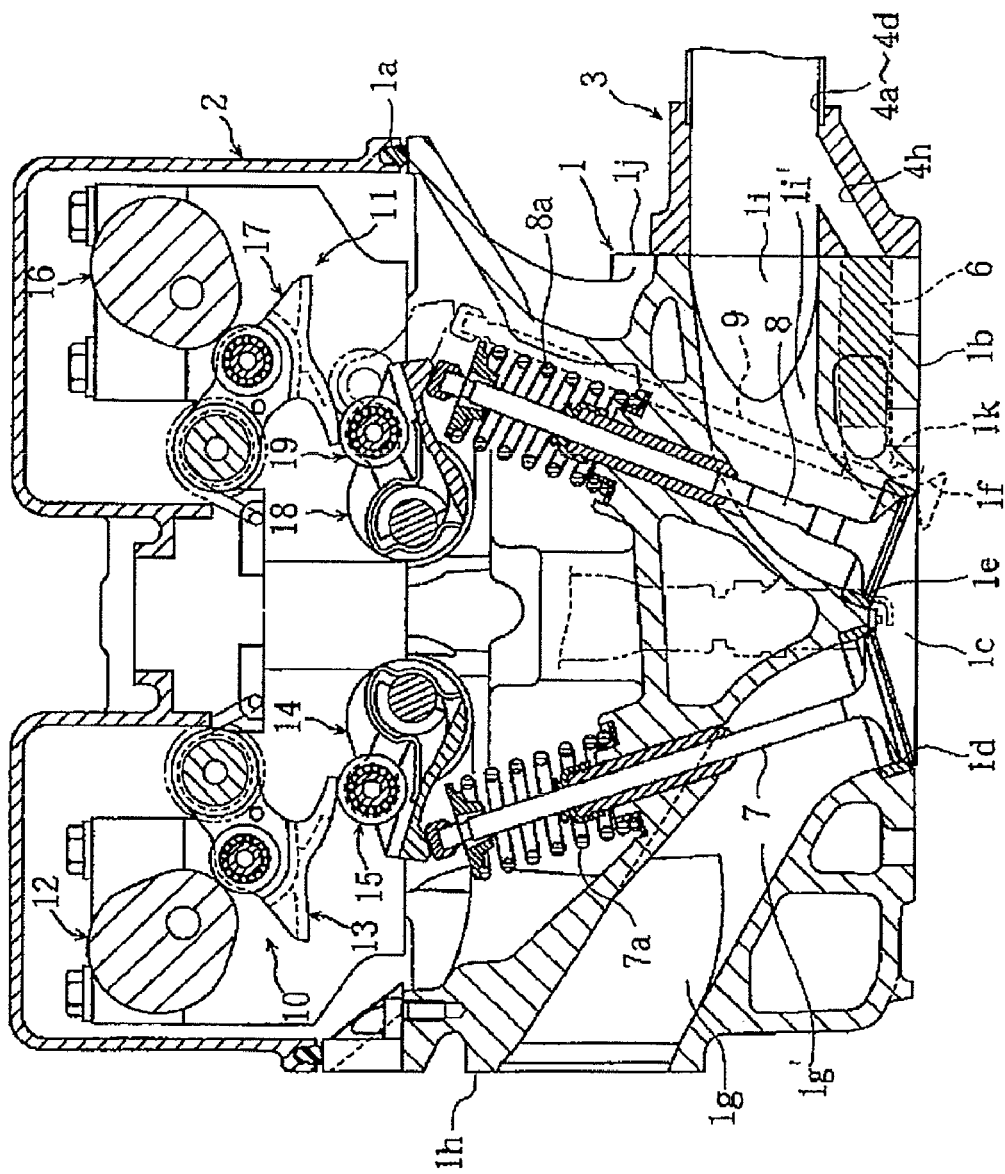

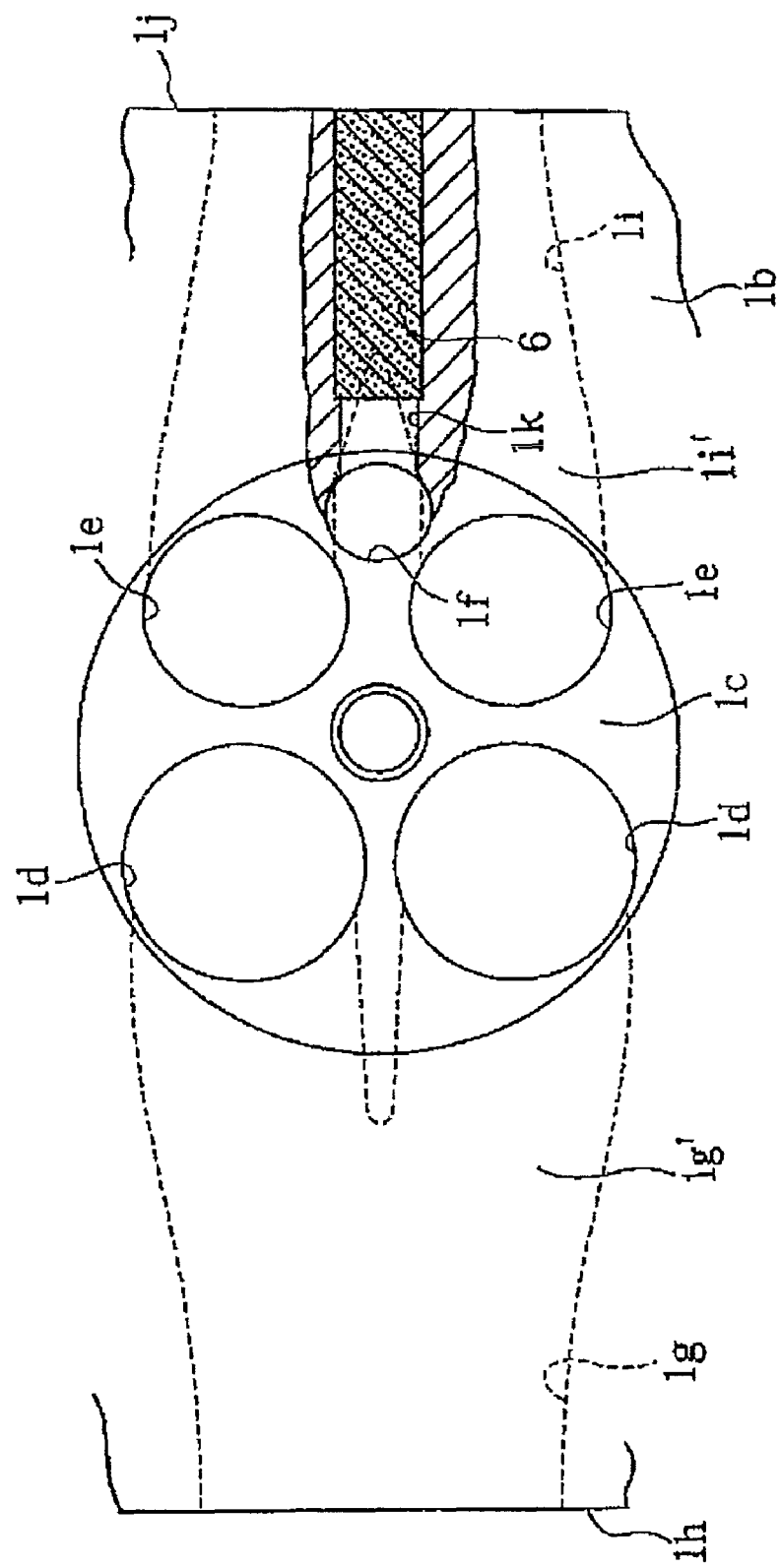
[FIG. 2]

[FIG. 3]
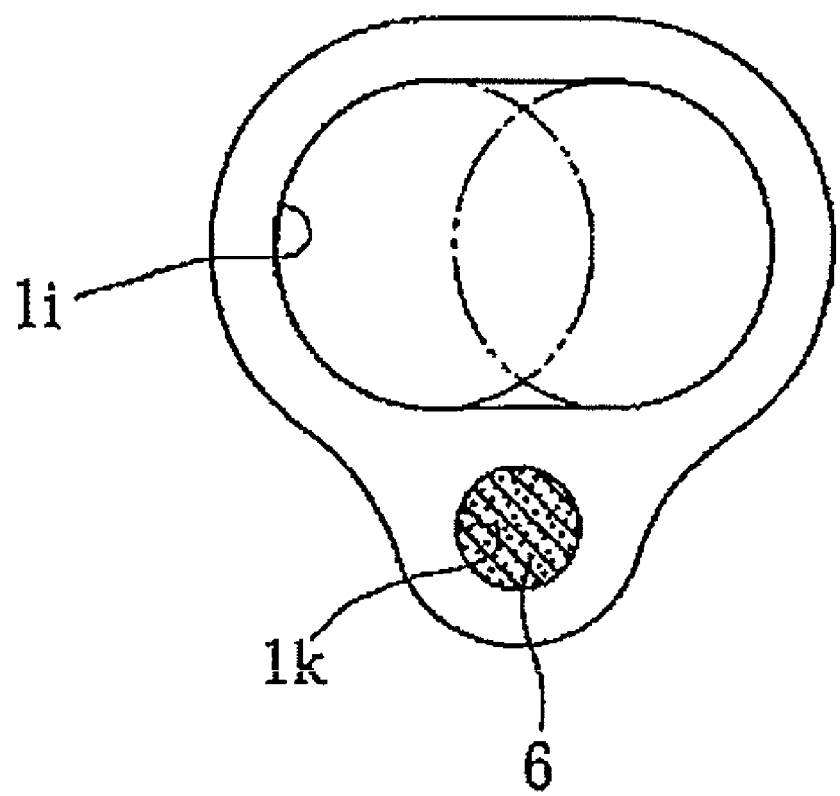

[FIG. 4]
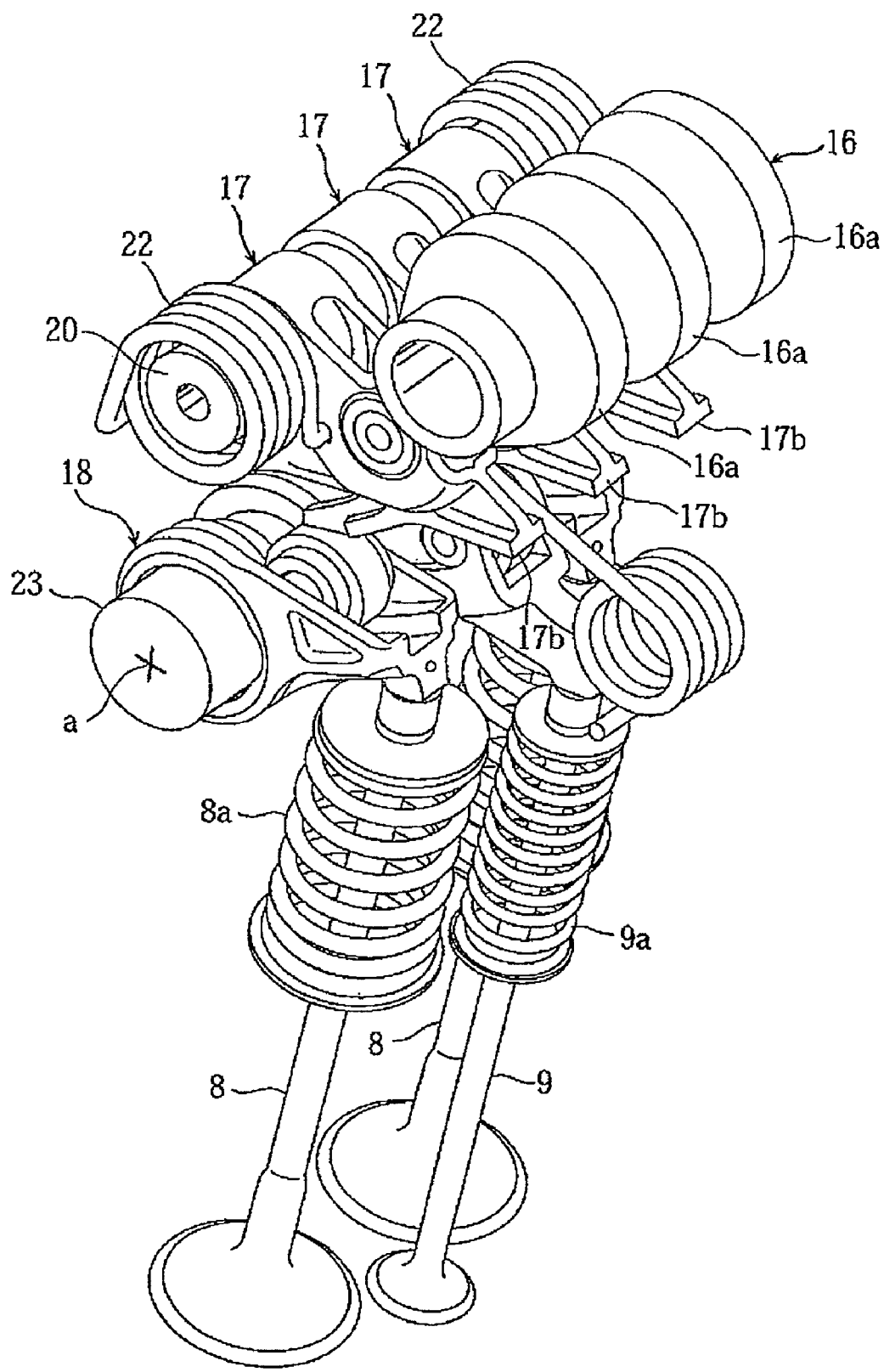

[FIG. 5]
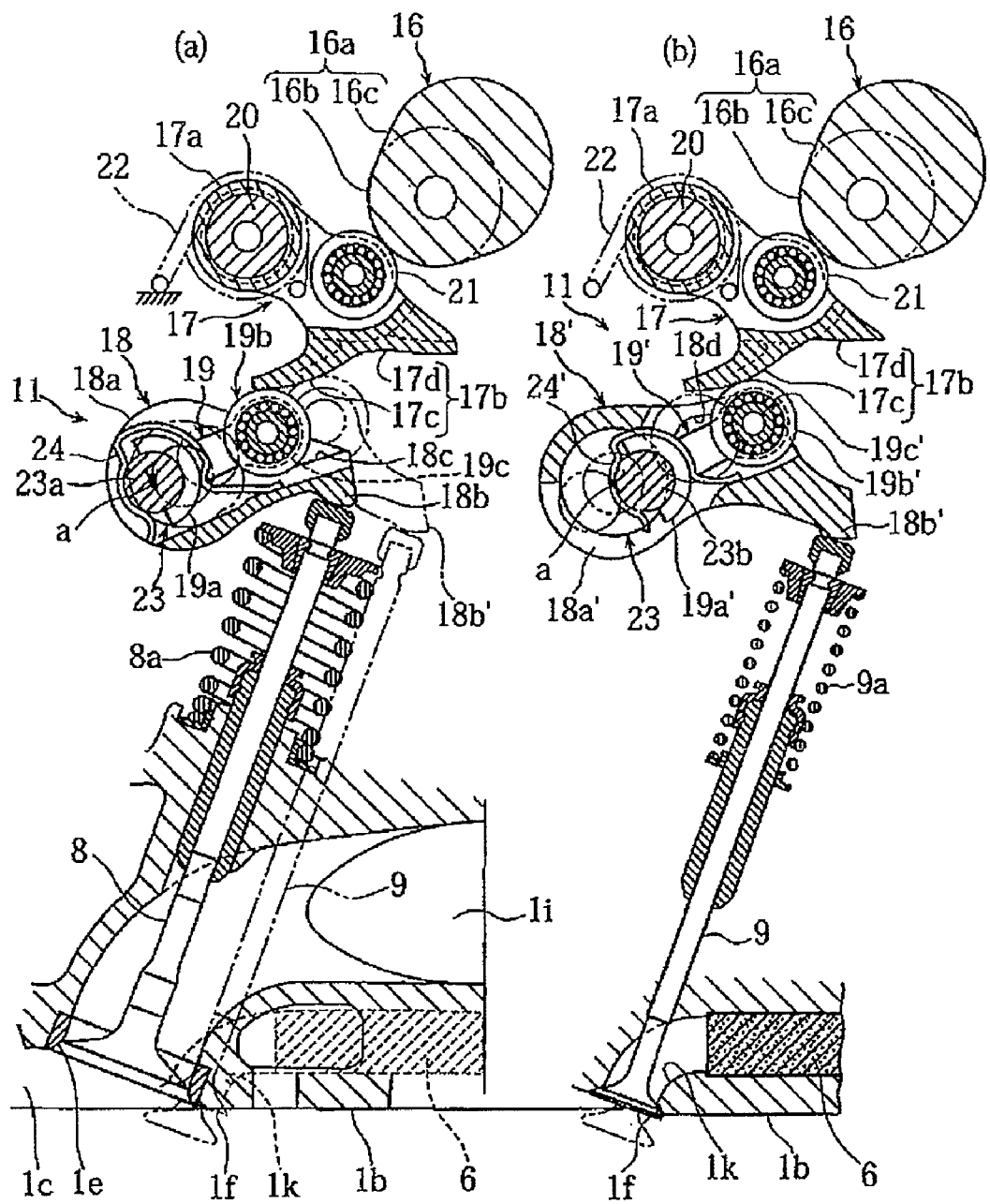

[FIG. 6]
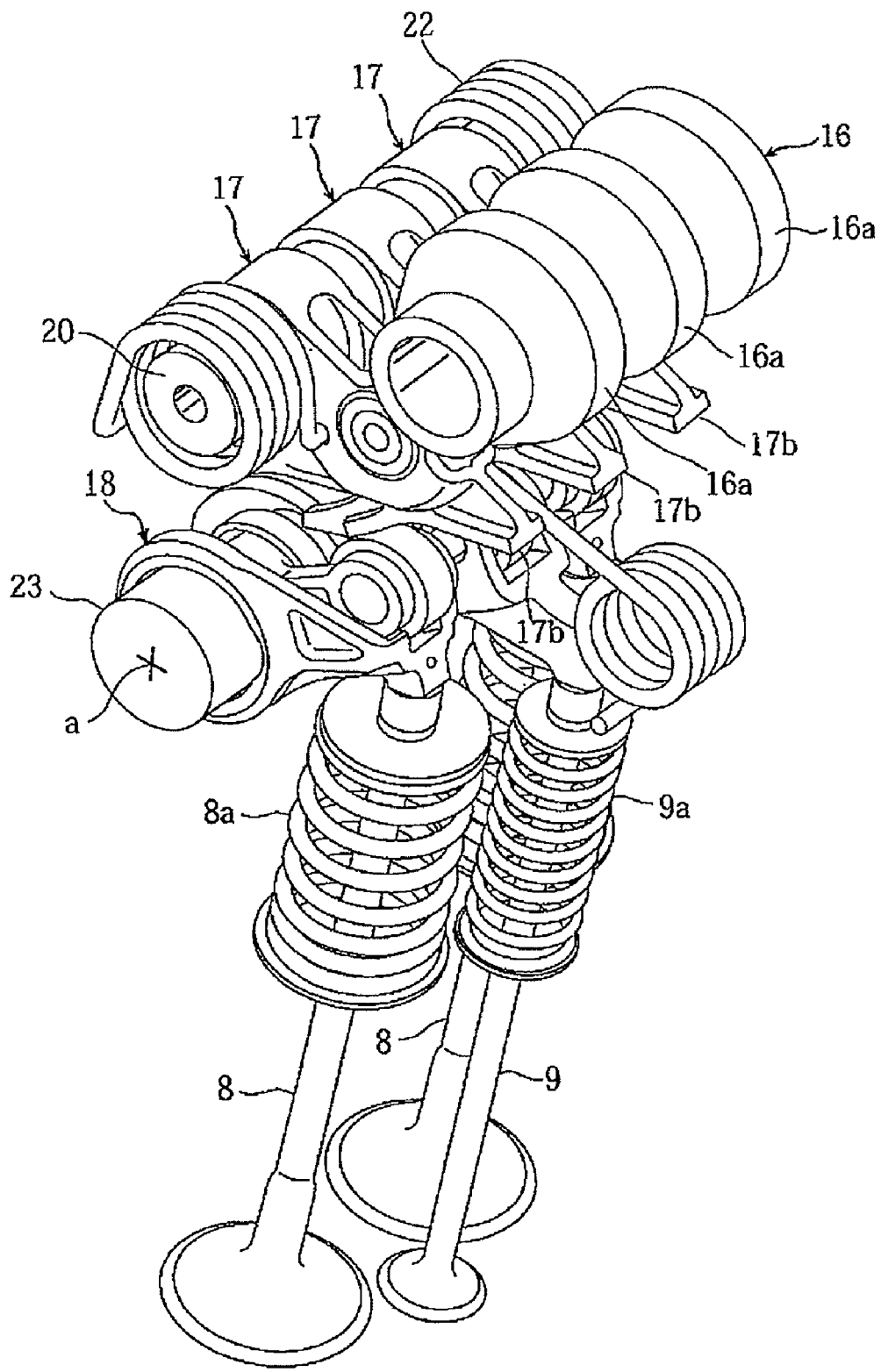

[FIG. 7]
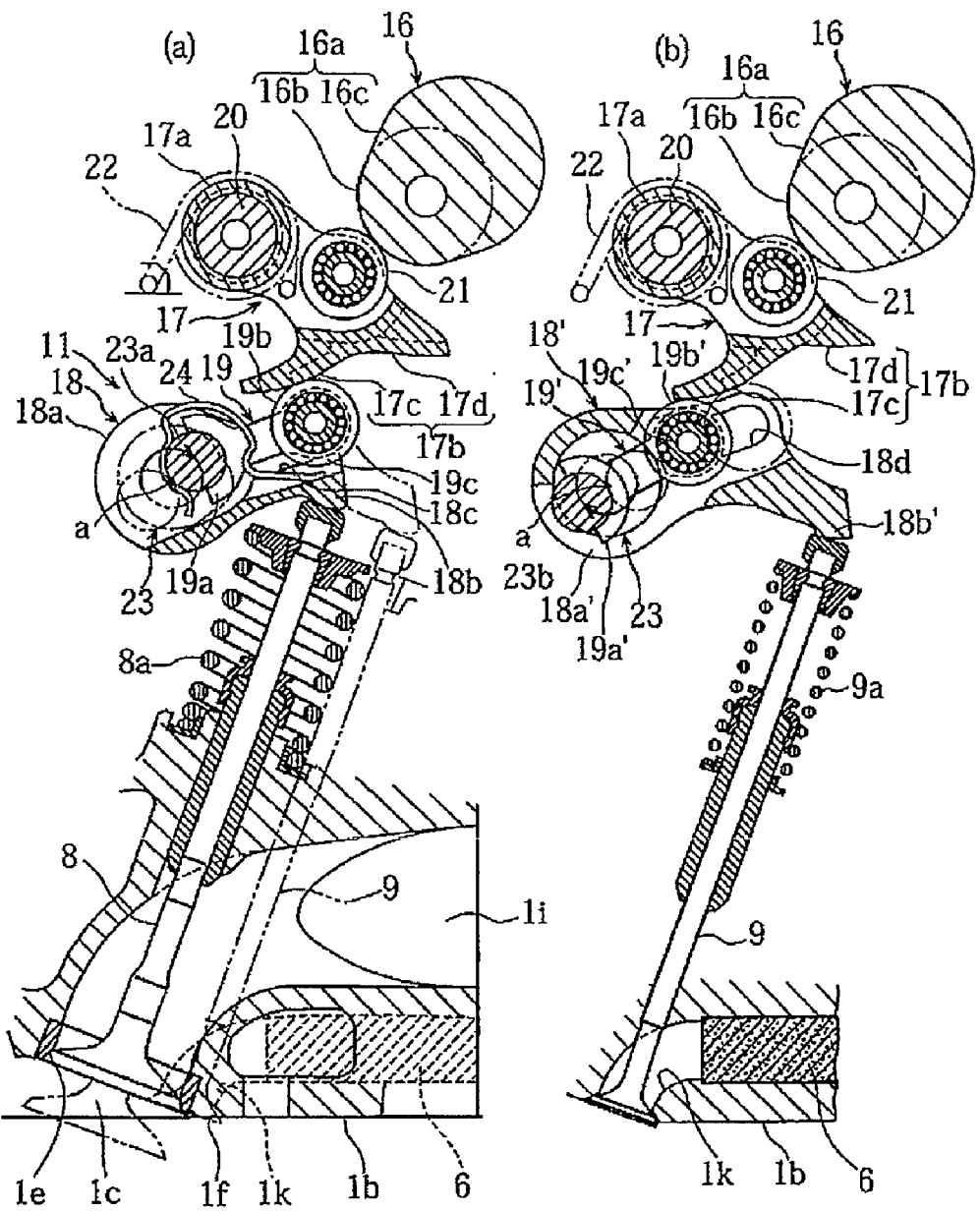

[FIG. 8]
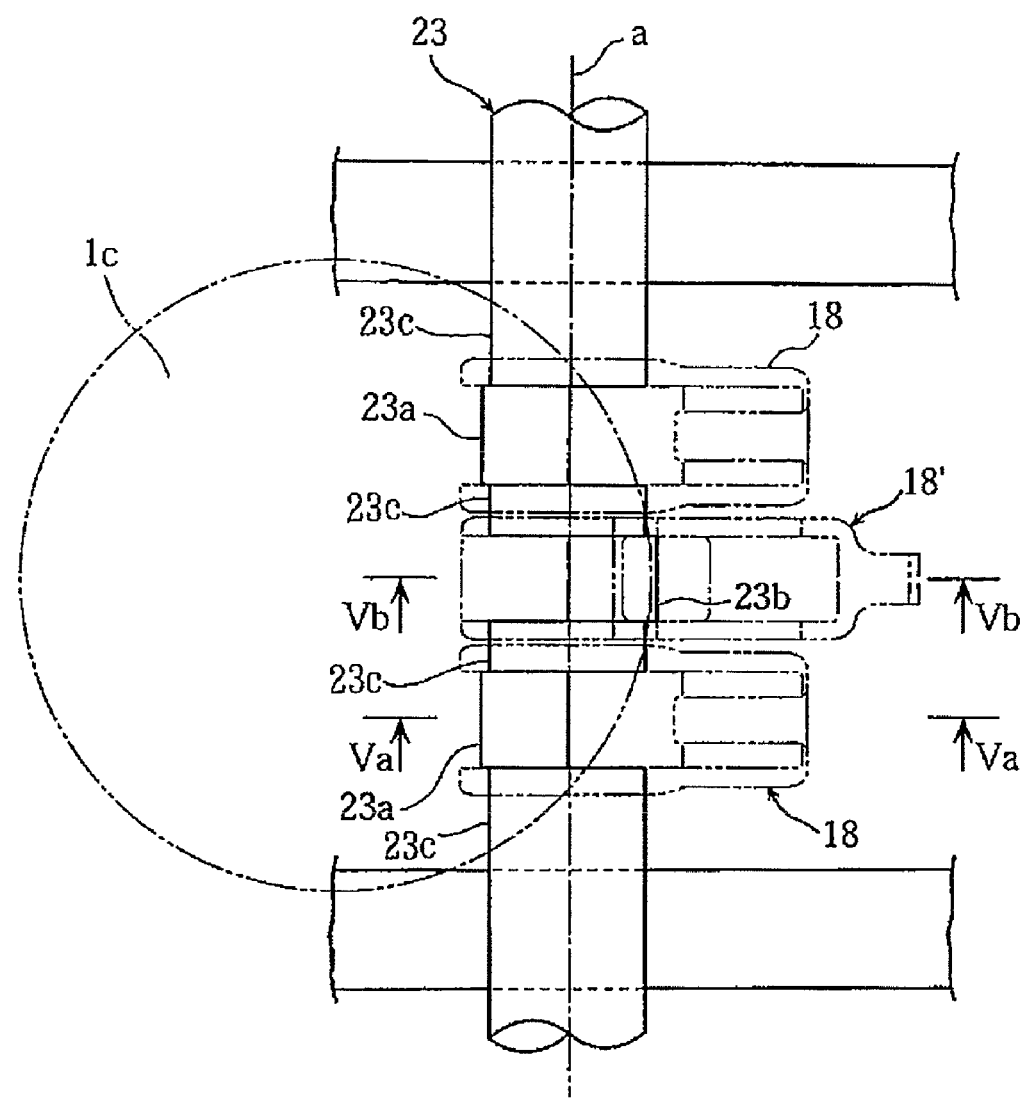

[FIG. 9]
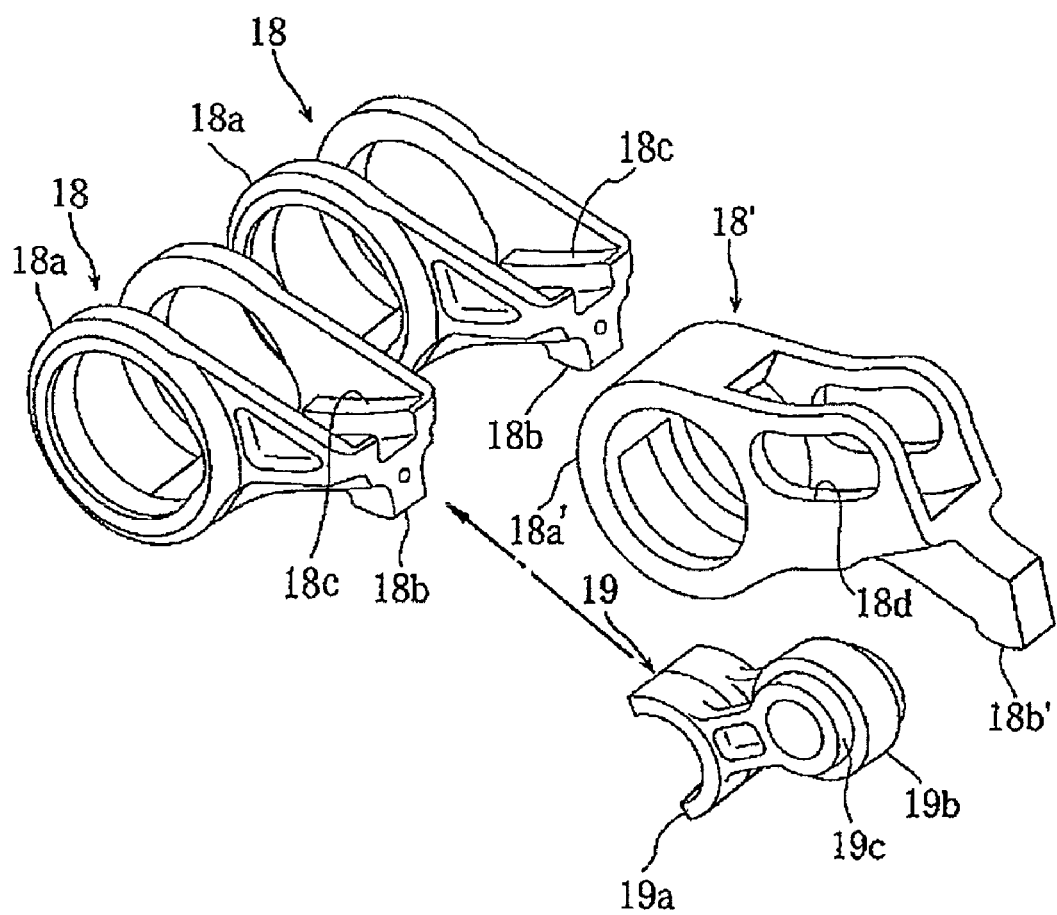

[FIG. 10]
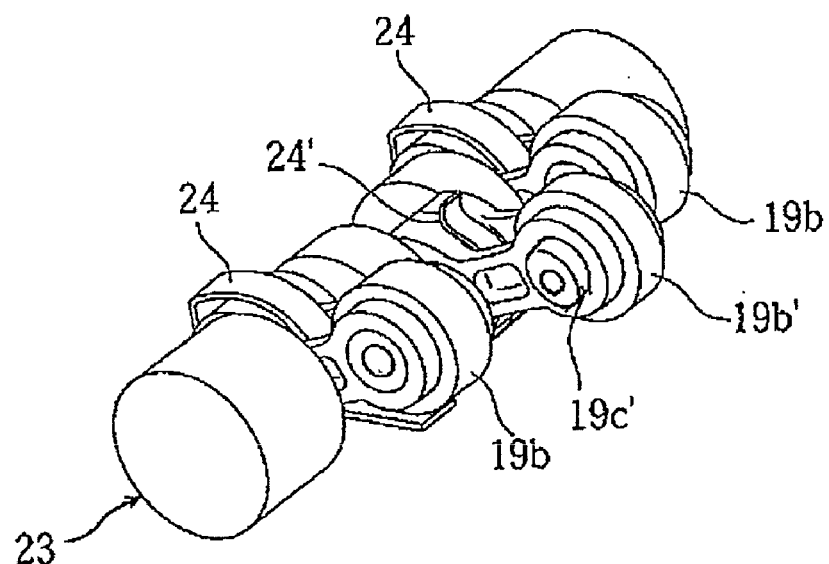
[FIG. 11]
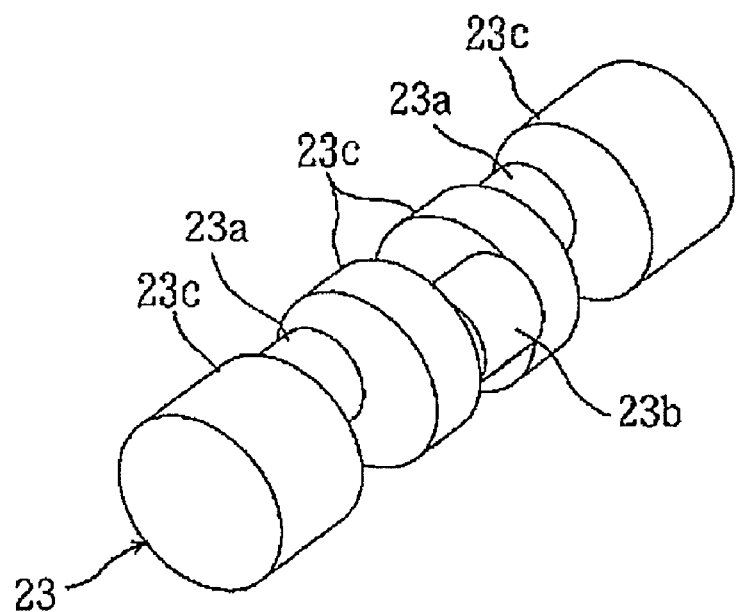

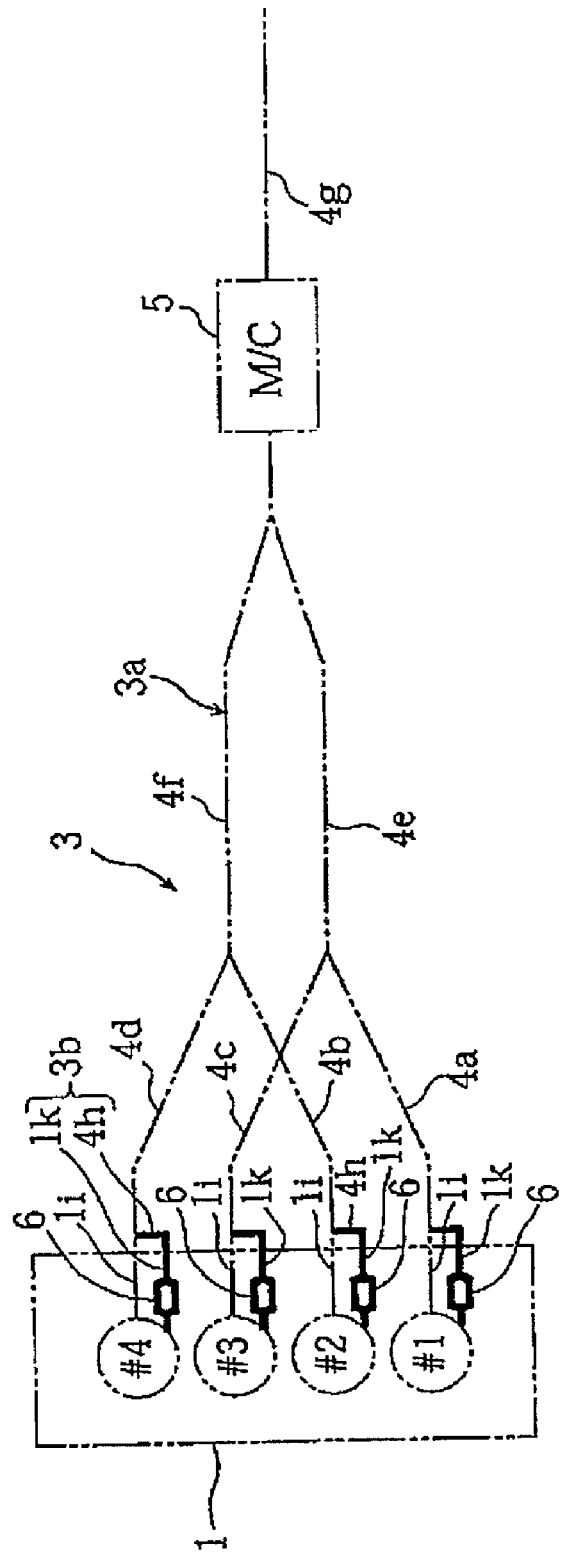
[FIG. 12]

[FIG. 13]
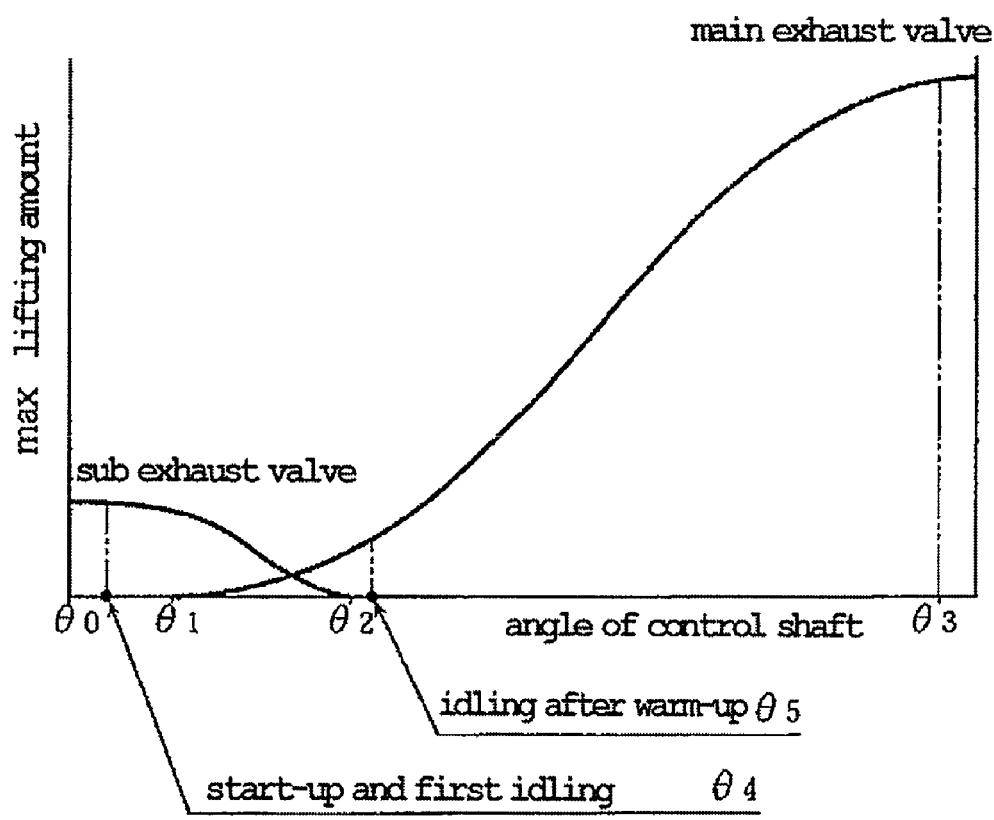

[FIG. 14]
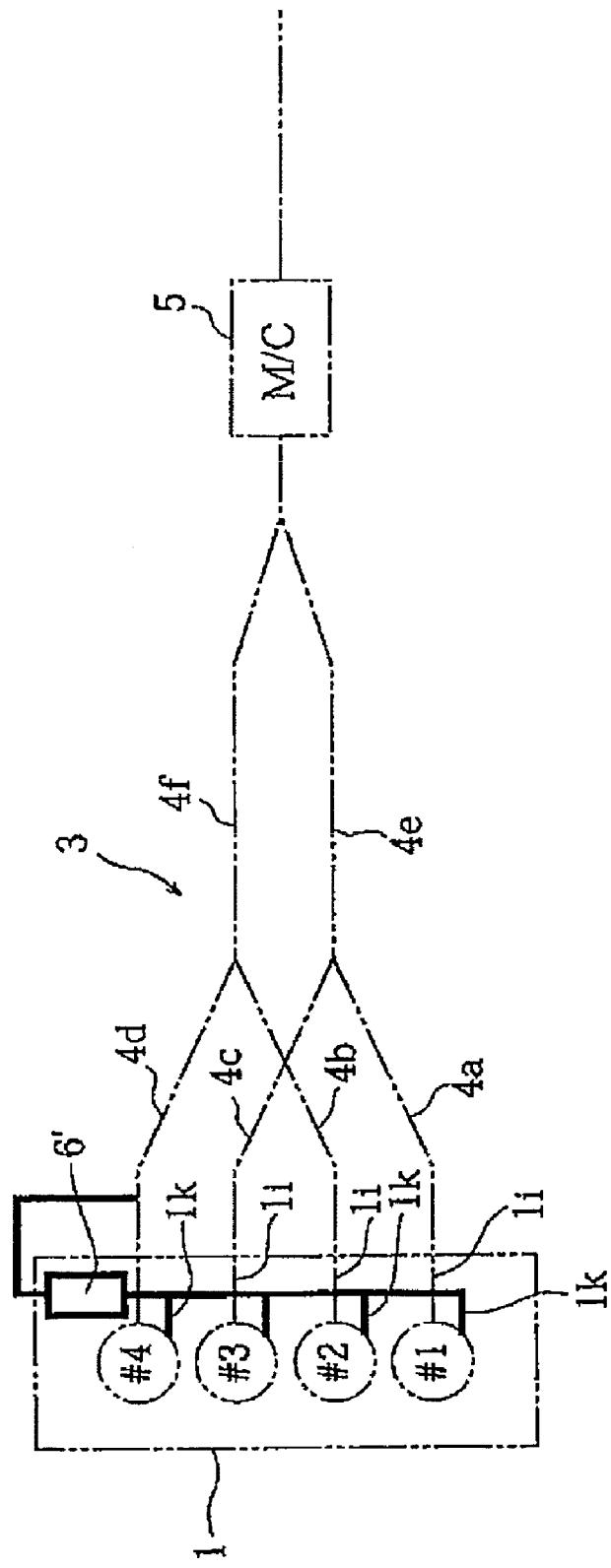

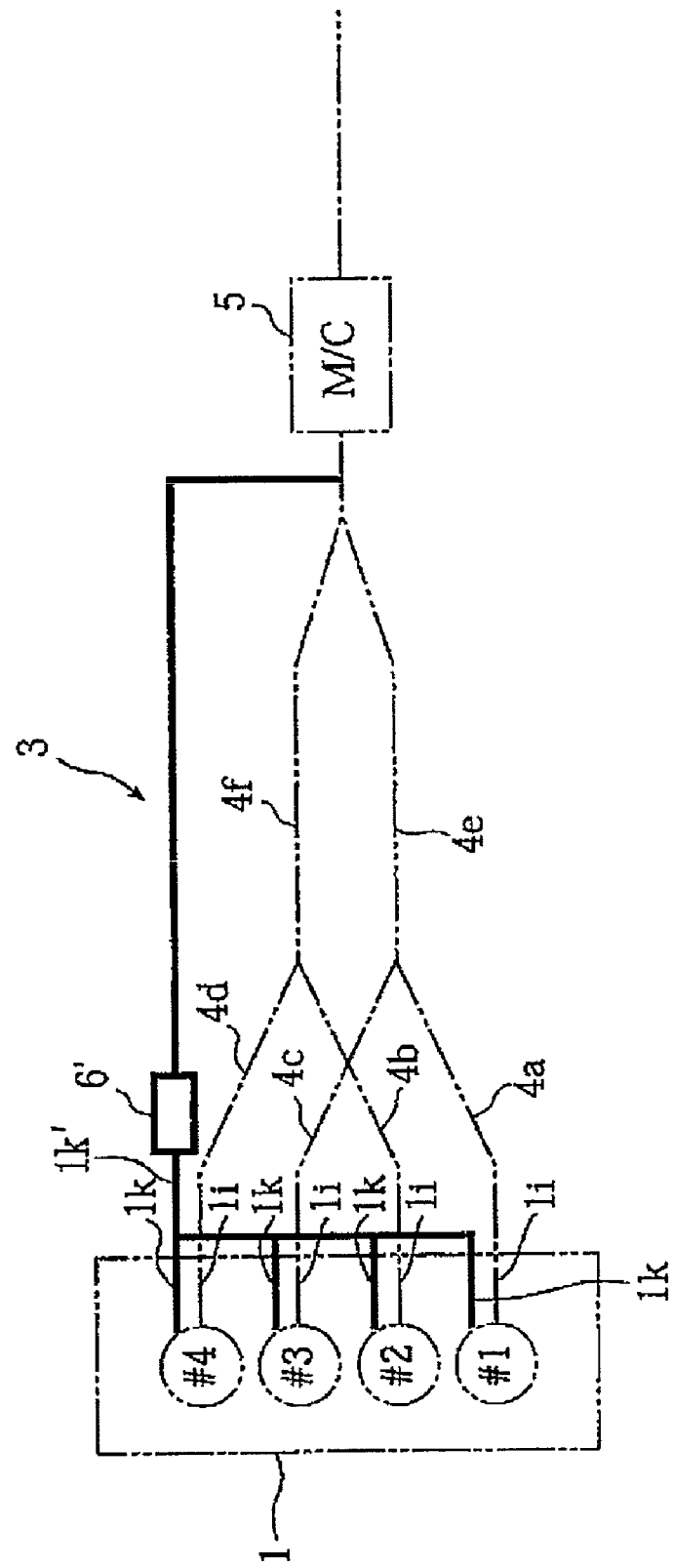
[FIG. 15]

ENGINE

RELATED APPLICATIONS

This application is a National Phase Application based on PCT Application No. PCT/JP2006/317428, filed Sep. 4, 2006, which claims priority to Japanese Application No. 2005-258322, filed Sep. 6, 2005, the entire contents of all of which are hereby incorporated by reference.

BACKGROUND OF THE INVENTIONS

1. Field of the Inventions

The present inventions relate to engines, and more particularly to engines, which can both purify exhaust gas and maintain higher power output.

2. Description of the Related Art

It is common to place one catalyst device in an exhaust system of an engine for purifying exhaust gas. It is preferable that such a catalyst device be disposed as far as possible from an exhaust opening of the engine from a viewpoint of preserving the power output and performance of the engine. On the other hand, the device catalyst should also be disposed as close as possible to the exhaust opening of the engine from a viewpoint of the exhaust gas purification, e.g., preserving the high temperature of the exhaust gas for heating the catalyst device.

One design, which responds to the aforementioned contradictory concerns, is disclosed, for example, in Japanese Patent Document JP-A-Hei 10-176523. In this conventional device, a switching valve 12 is provided within an exhaust pipe, and divides the exhaust passage into two systems 10 and 11. A catalyst 14 is placed within an exhaust passage 10, and a catalyst 17 is placed downstream of the catalyst 14.

SUMMARY OF THE INVENTIONS

An aspect of at least one of the embodiments disclosed herein includes the realization that in the foregoing conventional device, a problem may easily arise in functionality and reliability of the switching valve 12 because the switching valve 12 is exposed to hot gas. In addition, there occurs a problem that heat damage measures for a valve control mechanism is difficult. Furthermore, in the foregoing conventional device, due to its structure, there is a problem that the exhaust passages cannot be completely switched.

In accordance with an embodiment, an engine can comprise first and second exhaust valves, first and second exhaust passages opened and closed by the first and second exhaust valves, and a first catalyst disposed in the first exhaust passage. A second catalyst can be installed in the second exhaust passages so as to be located upstream of the first catalyst. A variable valve operating mechanism can be configured to adjust lifting amounts of the first and the second exhaust valves between approximately zero and a maximum lifting amount. Additionally, a lifting amount control unit can be configured to control lifting amounts of the first and the second exhaust valves with the variable valve operating mechanism such that an exhaust gas amount passing through the second exhaust passage is larger than that passing through the first exhaust passage, at least during start-up, and such that the exhaust gas amount passing through the first exhaust passage is larger than that passing through the second exhaust passage at least in a range of high-speed rotation and large-load operation of the engine after completion of warm-up operation.

In accordance with another embodiment, an engine can comprise a cylinder head having at least one combustion chamber surface. First, second, and third exhaust valve seats can open in the combustion chamber surface, the third exhaust valve seat being smaller than the first and second exhaust valve seats. First, second, and third exhaust valves can be engaged with the first, second, and third exhaust valve seats. First, second, and third exhaust passages can extend from the first, second, and third exhaust valve seats, respectively, toward an outer surface of the cylinder head, the third exhaust passage defining an exhaust port opening at the outer surface of the cylinder head, separate from the first and second exhaust passages. A first catalyst device can have an upstream end communicating with the third exhaust passage but not the first or second exhaust passages. A second catalyst device can have an upstream end communicating with the first and second exhaust passages. A variable valve operating mechanism can be configured to adjust lifting amounts of the first, second, and third exhaust valves between approximately zero and a maximum lifting amount. Additionally, a lifting amount control unit can be configured to control lifting amounts of the first, second, and third exhaust valves with the variable valve operating mechanism such that an exhaust gas amount passing through the third exhaust passage is larger than that passing through the first and second exhaust passages, at least during start-up, and such that the exhaust gas amount passing through the first and second exhaust passages is larger than that passing through the third exhaust passage at least in a range of high-speed rotation and large-load operation of the engine after completion of warm-up operation.

In accordance with yet another embodiment, an engine can comprise first and second exhaust valves, first and second exhaust passages opened and closed by the first and second exhaust valves, and a first catalyst disposed in the first exhaust passage. Second catalysts can be installed in the second exhaust passages so as to be located upstream of the first catalyst. Additionally, the engine can include means for controlling lifting amounts of the first and the second exhaust valves such that an exhaust gas amount passing through the second exhaust passage is larger than that passing through the first exhaust passage, at least during start-up, and such that the exhaust gas amount passing through the first exhaust passage is larger than that passing through the second exhaust passage at least in a range of high-speed rotation and large-load operation of the engine after completion of warm-up operation.

BRIEF DESCRIPTION OF THE DRAWINGS

These and other features, aspects and advantages of the present inventions are better understood with reference to preferred embodiments, which are illustrated in the accompanying drawings. The illustrated embodiments are merely exemplary and are not intended to define the outer limits of the scope of the present inventions. The drawings of the illustrated arrangements comprise the following figures:

FIG. 1 is a cross-sectional side view of a variable valve operating mechanism portion of an engine according to an embodiment.

FIG. 2 is a bottom view of a cylinder head of the engine seen from a part side connecting surface;

FIG. 3 is a front view of an outlet portion of an exhaust port of the engine.

FIG. 4 is a perspective view of an exhaust-side variable valve operating mechanism of the engine.

FIG. 5 is a cross-sectional side view of the exhaust-side variable valve operating mechanism.

FIG. 6 is a perspective view of the exhaust-side variable valve operating mechanism.

FIG. 7 is a cross-sectional side view of the exhaust-side variable valve operating mechanism.

FIG. 8 is a plan view of a control shaft of the exhaust-side valve operating mechanism.

FIG. 9 is a perspective view of a rocker arm and an intermediate arm of the exhaust-side valve operating mechanism.

FIG. 10 is a perspective view of the control shaft and the intermediate arm.

FIG. 11 is a perspective view of the control shaft.

FIG. 12 is a schematic plan view showing an exhaust system of the engine.

FIG. 13 is a characteristic chart showing a relationship between an angle of the control shaft and a maximum lifting amount of the valve operating mechanism.

FIG. 14 is a schematic plan view showing a variation of the exhaust system of the engine.

FIG. 15 is a schematic plan view showing another variation of the exhaust system of the engine.

DETAILED DESCRIPTION OF THE PREFERRED EMBODIMENT

An embodiment is described below with reference to the accompanying drawings. In the drawings, reference numeral 1 denotes a cylinder head of a water-cooled, four-stroke, transverse-mounted, four-cylinder engine, and reference numeral 2 denotes a head cover mounted to be removable on an upper side connecting surface 1*a* of the cylinder head 1. However, other types of engines can also be used. A variable valve operating mechanism, which characterizes this embodiment, is disposed in a head of the engine, which consists of the head covers 2 and the cylinder heads 1.

The exhaust systems are disclosed in the context of a four-stroke internal combustion engine because it has particular utility in this context. Such internal combustion engines can be used in any context and be incorporated into any type of device, such as, for example, but without limitation, vehicles including at least automobiles, motorcycles, golf carts, heavy-duty transportation, boats, watercraft, outboard motors, and industrial applications including at least generators and pumps and the like. However, the exhausts systems disclosed herein can be used in other contexts, such as, for example, but without limitation, any type of fluid control valves, for liquids, gases, or solids.

With reference to FIGS. 1 and 12, four combustion chambers 1*c* can be provided in an open manner on lower side connecting surfaces 1*b* of the cylinder heads 1 so as to correspond with a first to fourth cylinders #1 to #4 placed in parallel with a crankshaft direction (perpendicular direction of FIG. 1 on paper). In each of the combustion chambers 1*c*, two inlet openings 1*d*, 1*d* and two main exhaust openings 1*e*, 1*e* are respectively disposed per cylinder in parallel with the crankshaft direction and open into the combustion chamber. Also, one sub exhaust opening 1*f* can open between the main exhaust openings 1*e*, 1*e*.

The sub exhaust opening 1*f* can be, as shown in FIG. 2, located between the main exhaust openings 1*e* and 1*e* and on a peripheral edge of the combustion chamber 1*c*, and can also be located farther away from a cylindrical axis line than the main exhaust openings 1*e* when viewed in the crankshaft direction in FIG. 5.

The two inlet openings 1*d*, 1*d* can be introduced from one vertical wall 1*h* of the cylinder head 1 and can be connected to a Siamese inlet port 1*g*, which diverges into two ports 1*g'* in the middle. In addition, the two main exhaust openings 1*e*, 1*e* can also be derived from the other vertical wall 1*j* by a Siamese main exhaust port 1*i* (hereinafter simply referred to as the main port), which also diverges into two ports 1*i'* in the middle. The intake port 1*g* and the main exhaust port 1*i* can be a port, which is not a Siamese type but an independent type, one for each of the intake and exhaust openings.

Furthermore, the sub exhaust opening 1*f* can be derived, lower than the main exhaust port 1*i* of the vertical wall 1*j*, from a sub exhaust port 1*k* formed to pass through between the main exhaust port 1*i* and the lower side connecting surface 1*b*.

An exhaust device 3 can be connected to the main exhaust port 1*i* (see FIG. 12). The exhaust device 3 can be a so-called 4-2-1 exhaust system. Such an exhaust system can include four (4) first to fourth exhaust pipes 4*a* to 4*d* connected to the main ports 1*i* of the first to fourth cylinder #1 to #4; two (2) first and second merging pipes 4*e*, 4*f*, into which the first and the third exhaust pipes 4*a*, 4*c*, and the second and the fourth exhaust pipes 4*b*, 4*d* respectively merge; and one (1) main pipe 4*g*, into which the first and second merging pipes 4*e*, 4*f* merge.

Then, each of the sub exhaust ports 1*k* of each of the cylinders can merge near at a junction of the first to fourth exhaust pipes 4*a* to 4*d* with the main exhaust port 1*i* via a sub exhaust pipe 4*h*.

A main catalyst 5 and sub catalysts 6 can be respectively disposed in the main pipe 4*g* and each of the sub exhaust ports 1*k*. The main catalyst 5 can be placed in the main pipe 4*g* into which all the exhaust pipes of the exhaust device 3 merge. The position of the main catalyst 5 is set in a downstream side, which is adequately separated from the exhaust openings in order to increase air-intake by utilizing exhaust pulsation. Meanwhile, the sub catalysts 6 can be placed within the sub exhaust port 1*k* in the cylinder head 1. The position of the sub catalysts 6 can be set in a position which is so close to the exhaust port that the temperature of the catalyst rises to activation temperature by heat of exhaust gas in an extremely short time.

In some embodiments, a main exhaust passage (first exhaust passage) 3*a* can include the main exhaust ports 1*i*, the first to fourth exhaust pipes 4*a* to 4*d*, the first and second merging pipes 4*e*, 4*f*, and the main pipe 4*g*. The main catalyst 5 can serve as a first catalyst (the term "first" being an arbitrary label). Also, a sub exhaust passage (second exhaust passage) 3*b* includes the sub exhaust ports 1*k* and the sub exhaust pipes 4*h*. One or more of the sub catalysts 6 can serve as a second catalyst (the term "second" being an arbitrary label).

Inlet valves 7,7 can be disposed in the inlet openings 1*d*, 1*d* to make the inlet openings openable and closable. Each of the inlet valves 7 can be urged in a closing direction by an inlet valve spring 7*a*. Also, main exhaust valves (first exhaust valves) 8,8 can be disposed in the main exhaust openings 1*e*, 1*e* to make the exhaust openings openable and closable. Each of the main exhaust valves 8 can be urged in the closing direction by a main exhaust valve spring 8*a*. Furthermore, a sub exhaust valve (second exhaust valve) 9 can be disposed in the sub exhaust opening 1*f* to make the exhaust opening openable and closable. The sub exhaust valve 9 can be urged in the closing direction by a sub exhaust valve spring 9*a*.

The intake valves 7 can be driven open and closed by an intake-side variable valve operating mechanism 10, and the main and sub exhaust valves 8, 9 can be driven open and closed by an exhaust-side variable valve operating mechanism 11. The intake-side variable valve operating mechanism 10 and the exhaust-side variable valve operating mechanism 11 can be configured such that a lifting amount and an opening period of each valve are continuously changeable from zero to a maximum value.

The intake-side variable valve operating mechanism 10 can include an intake camshaft 12, an intake rocking members 13, an intake rocker arm 14, and an intake intermediate arm (intermediate member) 15. The exhaust-side variable valve operating system 11 can include an exhaust camshaft 16, exhaust rocking members 17, main and sub exhaust rocker arms 18, 18', and main and sub exhaust intermediate arms (intermediate members) 19, 19'. The intake and exhaust-side variable valve operating mechanisms 10, 11 can have generally the same structure; therefore, set forth below is a detailed description of the structure of only the exhaust-side variable valve operating mechanism 11.

The exhaust camshaft 16 can be supported in parallel with a crankshaft (not shown) by the cylinder head 1, and can be rotary-driven by the crankshaft via a timing belt (not shown). The exhaust camshaft 16 can include three cam noses 16a per cylinder, and each of the cam noses 16a can have a base circular section 16b and a lifting section 16c.

Two exhaust rocking members 17 can be provided for the main exhaust valves 8 and one can be provided for the sub exhaust valve 9. Thus, there can be three exhaust rocking members 17 for each cylinder. Each of the exhaust rocking members 17 can be arm-shaped, and a ring 17a in a base side can be supported swingably in the cylinder head 1 by a pivot shaft 20, which can be located in parallel with the camshaft 16. Also, a cam surface 17b can be formed at a tip of the exhaust rocking member 17, and a rocking roller 21 can be supported for rotation between the cam surface 17b and the ring 17a.

The cam surface 17b can include a base 17c and a lifting section 17d. The base 17c can be formed so as to make an arc around an axial line of the pivot shaft 20 and thus to maintain the lifting amount at zero. Also, the lifting section 17d can be formed such that it can be connected with the base 17c and that a lifting amount becomes larger as the lifting section 17d moves away from the base 17c.

The rocking roller 21 can contact the cam noses 16a of the exhaust camshaft 16. The rocking members 17 are urged in a counterclockwise direction of FIG. 5 by an urging spring 22 such that the rocking roller 21 constantly contacts with the cam noses 16a.

Two main rocker arms 18 can be provided for the main exhaust valves 8 (two per cylinder), and one sub rocker arm 18' for the sub exhaust valves 9 can be provided for each cylinder. Each of the rocker arms 18, 18' can be supported swingably by a support part 23c of a shared control shaft 23 by which rings 18a, 18a' in base sides of the rocker arms 18, 18a can also be supported for turning in parallel with the camshaft in the cylinder head 1. A pressing part 18b, 18b' formed at a tip of each of the rocker arms 18, 18' contact upper end surfaces of the main and sub exhaust valves 8, 9 via a pad. Because the sub exhaust valve 9 can be located so as to separate more outwardly from the cylindrical axial line than the main exhaust valves 9 as described above, the sub rocker arm 18' can be formed longer than the main rocker arms 18.

The control shaft 23 can be, as shown in FIG. 4 and FIG. 11, formed so as to be concentric with an axial line "a" and divided into four portions. The control shaft 23 can have support parts 23c for supporting the rocker arms 18, 18', main eccentric pins 23a, 23a eccentrically-disposed to a periphery side from the axial line "a" between the support parts 23c, and a sub eccentric pin 23b disposed between both of the main eccentric pins 23a, 23a, and eccentrically installed on the opposite side of the main eccentric pins 23a across the axial line "a".

Bases 19a, 19a' of the main and sub intermediate arms 19, 19' can be supported swingably by the main and sub eccentric pins 23a, 23b. The bases 19a, 19a' can be in a semicircular pattern and can be attachable to the eccentric pins 23a, 23b inwardly in a radial direction from outside. The bases 19a, 19a' can be supported by the eccentric pins 23a, 23b and retained by holding springs 24, 24' made up of leaf or other types of springs. Thereby, the intermediate arms 19, 19' are capable of swinging around the eccentric pins.

In addition, pressing surfaces 19c can be formed in boss parts, which can rotatably support rollers 19b of the main intermediate arms 19, are can be slidingly connected with pressed tiers 18c formed in the main rocker arms 18. Furthermore, a pin 19c', which can rotatably support a roller 19b' of the sub intermediate arm 19', can be formed to be elongate in the axial direction so as to project further from a boss part of the intermediate arm 19'. Additionally, the projections can be inserted to be slidable into guiding long holes 18d formed on the sub rocker arm 18'. Thereby, the main and sub intermediate arms 19, 19' and the main and sub rocker arms 18, 18' can swing along with swinging of the rocking members 17, and drive for opening and closing the main and sub exhaust valves 8, 9.

An actuator such as a servomotor can be connected to one end of the control shaft 23, and a rotational angle of the control shaft 23 can be controlled by a controller (lifting amount control unit) via an actuator.

The relative locations of the intermediate arms 19, 19' with respect to the cam surfaces 17b of the rocking members 17 can change in response to the rotational angle of the control shaft 23. Thereby, the lifting amount can be variably controlled. For example, as the rollers 19b of the intermediate arms proceed to the lifting sections 17d of the cam surfaces 17b, the lifting amount increases. On the other hand, as the rollers 19b withdraw to the bases 17c, the lifting amount decreases.

In some embodiments of the engine, when the camshafts 16 rotate, the rocking members 17 swing around the pivot shafts 20 by the cam noses 16a, and the cam surfaces 17b of the rocking members 17 drive for opening and closing the main and sub exhaust valves 8, 9 via the main and sub intermediate arms 19, 19' and the main and sub rocker arms 18, 18'. In this case, the lifting amounts and the opening periods of the main and sub exhaust valves 8, 9 can be continuously controlled by controlling the rotational angle of the control shaft 23 with the controller as described above. This principal operation also applies to the intake valve side.

For example, as shown in FIG. 5(a), if the rotational angle of the control shaft 23 is controlled from θ0 to θ1 (see FIG. 13) so that the main intermediate arms 19 are positioned near the back ends, which are farthest from the rocking members 17, the rollers 19b of the main intermediate arms 19 come to contact with rear ends of the base 17c of the cam surfaces 17b of the rocking members 17. Therefore, the main intermediate arms 19 and the main rocker arms 18 do not swing even when the rocking members 17 swing by the rotation of the camshafts 16. As a result, valve lift amounts of the main exhaust valves 8 remain zero.

On the other hand, in the aforementioned state, the sub intermediate arm 19' can be positioned near the proceeding end, which can be the closest to the rocking member 17. Therefore, the roller 19a' of the sub intermediate arm 19' contacts a vicinity of a border between the lifting section 17d and the base 17c of the cam surface 17a. Accordingly, the sub intermediate arm 19' and the sub rocker arm 18' swing broadly when the rocking member 17 swings by the rotation of the camshaft 16. As a result, the valve lift amount of the sub exhaust valve 9 becomes approximately the maximum.

The lifting amount of the sub exhaust valve 9 gradually decreases as the rotational angle of the control shaft 23 increases to be greater than θ1, and becomes zero when the rotational angle becomes θ2. On the other hand, the lifting amounts of the main exhaust valves 8 increase as the rotational angle of the control shaft 23 increase to be greater than θ1, and reaches approximately the maximum when the rotational shaft becomes θ3.

In the engine 1 of this embodiment, the rotational angle of the control shaft 23 can be set at θ4 at start-up and in a first idling period before warm-up. Thereby, the valve lift amounts of the main exhaust valves 8 become zero, and those of the sub exhaust valves 9 become approximately the maximum. Therefore, the exhaust gas can be discharged to the outside from the sub exhaust openings 1f through the sub exhaust ports 1k and the sub catalysts 6.

In embodiments where the sub catalysts 6 are disposed in the vicinity of the engine combustion chambers 1c as described above, the exhaust gas flowing through the sub catalysts 6 is at high temperature because the gas is produced by combustion within the combustion chambers 1c, and travels only a short distance to the catalysts 6, thus reducing the heat loss from the gas and reducing temperature drop. Thereby, the temperature of the sub catalysts 6 reaches the activation temperature faster after the engine start-up, and the purification of the exhaust gas by the sub catalysts 6 can be steadily executed soon after the engine start-up. As a result, the purification performance for the exhaust gas in a case of the low engine temperature at the engine start-up or in the period of the first idling can be improved.

On the other hand, after completion of the warm-up operation of the engine, the rotational angle of the control shafts 23 can be controlled, for example, at θ5 in the idling operating state, and also can be controlled at the maximum angle θ3 side in accordance with the engine operating state, for example, as the engine operating state gets close to the region of the high-speed rotation and large-load operation. Thereby, the sub exhaust valves 9 are retained in a full-closed state, and the exhaust gas can be discharged to the outside from the main exhaust openings through each of the exhaust pipes 4a to 4d, each of the merging pipes 4e, 4f, the main pipe 4g, and further the main catalyst 5. In this case, because the main catalyst 5 reaches the activation temperature due to the warm-up operation, the purification of the exhaust gas can be steadily executed.

Because the valve lift amounts of the sub exhaust valves 9 are set to zero after the warm-up operation, and because only the valve lift amounts of the main exhaust valves 8 are controlled in accordance with the engine operating state, the output can be improved in comparison with a case in which the main catalyst 5 can be provided in the proximity of the engine. That is, because the main catalyst 5 can be located in a position that can be distant enough from the exhaust openings to increase the air intake into each cylinder by utilizing the exhaust pulsation, the sub catalysts 6 do not interfere with the use of exhaust pulsation for improving the evacuation of exhaust gases out of the cylinders and the resulting improvement of fresh air intake into the cylinders.

Also, because the exhaust gas does not flow into the sub catalysts 6 in the range of high-speed rotation and large-load operation, the sub catalysts 6 are protected from heat damage.

In addition, in some embodiments, because a pathway in which the exhaust gas flows can be switched by utilizing the movement of the variable valve operating mechanism 11, which can be configured to be able to freely change the lifting amounts of the main and sub exhaust valves 8, 9 from zero to the maximum, by changing the relative locations of the intermediate arms 19, 19' with respect to the rocking members 17, it can be possible to avoid troubles such as one in a conventional device provided with switching valves in the exhaust passages. For example, certain difficulties in providing heat damage measures for a low-functioning, low-trustworthy valve control mechanism due to exposing of the switching valves to hot gas, can be avoided. Also, in the conventional device described in the Background section above, there can be a structural problem that such exhaust passages are not reliably and completely switched. However, the complete switching of the exhaust passages can be possible in some of the present embodiments because such embodiments utilize the exhaust valves normally disposed in the exhaust ports, and controls the lifting amounts of the exhaust valves to be zero to achieve complete switching.

Moreover, in some embodiments, because the sub catalysts 6 are located within the sub exhaust ports 1k provided in the cylinder head 1, the sub catalysts 6 can be located in proximity of the exhaust opening of the engine without complicating the structure of the exhaust system.

Furthermore, because the sub exhaust ports 1k, which house the sub catalysts 6, can be positioned between the main exhaust ports 1i and the cylinder block side connection surfaces 1b when seen in the camshaft direction, the sub catalysts 6 can be placed by effectively utilizing an otherwise unused space in the cylinder heads 1.

In some embodiments, one sub catalyst 6 is provided for each cylinder #1 to #4 in the cylinder head 1. However, various alternative examples are adoptable in terms of placement of the sub catalyst 6. For example, as shown in FIG. 14, the four sub exhaust ports 1k can be merged into one (or more) port within the cylinder head, and one (or more) sub catalyst 6' can be disposed in the merging part.

Although the sub catalysts are installed in the cylinder head, the sub catalysts are not necessarily installed in the cylinder head. In some embodiments, sub catalyst can be as close as possible to the exhaust ports so that it can rise to the activation temperature in a short time. For example, as shown in FIG. 15, the sub catalysts 6' can be disposed in the second exhaust pipes 1k' connected to the second exhaust ports 1k.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An engine comprising:
   a first exhaust valve and a second exhaust valve;
   a first exhaust passage and a second exhaust passages opened and closed by the first and second exhaust valves, respectively;
   a first catalyst disposed in the first exhaust passage;
   a second catalyst disposed in the second exhaust passage so as to be located upstream of the first catalyst;
   a variable valve operating mechanism configured to adjust lifting amounts of the first and the second exhaust valves between approximately zero and a maximum lifting amount; and
   a lifting amount control unit configured to control lifting amounts of the first and the second exhaust valves with the variable valve operating mechanism such that an exhaust gas amount passing through the second exhaust passage is larger than an exhaust gas amount passing through the first exhaust passage at least during start-up of the engine, and such that the exhaust gas amount passing through the first exhaust passage is larger than the exhaust gas amount passing through the second exhaust passage at least in a range of high-speed rotation and large-load operation of the engine after completion of a warm-up operation of the engine; wherein
   the second catalyst is provided in a cylinder head and is disposed within a second exhaust port which defines a portion of the second exhaust passage; and
   the first exhaust valve includes two first exhaust valves disposed side-by-side in a camshaft direction, and the second exhaust valve is disposed between the two first exhaust valves.

2. The engine according to claim 1, wherein:
   the variable valve operating mechanism is configured to increase and decrease the lifting amounts of the two first exhaust valves and the second exhaust valve along with an increase and decrease in a control amount of the lifting amount control unit; and
   the lifting amount control unit is configured to control the variable valve operating mechanism such that the lifting amount of the two first exhaust valves becomes approximately zero and the lifting amount of the second exhaust valve becomes approximately maximum at least during the start-up of the engine, and is configured to control the variable valve operating mechanism such that the lifting amount of the two first exhaust valves becomes larger than the maximum lifting amount of the second exhaust valve in the range of the high-speed rotation and large-load operation after the completion of the warm-up operation of the engine.

3. The engine according to claim 2, wherein the variable valve operating mechanism comprises a camshaft disposed in parallel with a crankshaft and rotary-driven by the crankshaft, a rocking member disposed swingably around a pivot shaft, which is in parallel with the camshaft and rotary-driven by the camshaft, a rocker arm disposed swingably around a control shaft, which is parallel with the camshaft, and configured to drive opening and closing of the two first exhaust valves and the second exhaust valve, an intermediate member disposed either between the rocker arm and the rocking member or between the camshafts and the rocking member to make a swing movement of the rocking member transmittable to the rocker arm and to make a relative position of a rocking center of the rocking member changeable, and wherein the lifting amount control unit controls a relative position of the intermediate member with respect to the rocking member such that a lifting amount of the two first exhaust valves becomes approximately zero and the lifting amount of the second exhaust valve becomes approximately maximum at least during the start-up of the engine, and that the lifting amount of the two first exhaust valves becomes larger than the maximum lifting amount of the second exhaust valve in a range of the high-speed rotation and large-load operation after completion of the warm-up operation of the engine.

4. The engine according claim 1, wherein the lifting amount control unit is configured to control the variable valve operating mechanism such that a lifting amount of the two first exhaust valves increases as a lifting amount of the second exhaust valve decreases during the warm-up operation of the engine proceeding from the start-up of the engine, such that an overlapping operation when the second exhaust valve and the two first exhaust valves lift together can be obtained.

5. The engine according to claim 2, wherein the lifting amount control unit is configured to control the variable valve operating mechanism such that a lifting amount of the two first exhaust valves increases as a lifting amount of the second exhaust valve decreases during the warm-up operation of the engine proceeding from the start-up of the engine such that an overlapping operation when the second exhaust valve and the two first exhaust valves lift together can be obtained.

6. The engine according to claim 4, wherein during the overlapping operation, the exhaust gas amount flowing through both of the first and second exhaust passages either remains constant or continuously increases due to the lifting amount of the second exhaust valve decreasing and the lifting amount of the two first exhaust valves increasing.

7. The engine according to claim 1, wherein the first exhaust passage includes two first exhaust passages and two first exhaust ports defining portions of the two first exhaust passages, and the second exhaust port is positioned between the two first exhaust ports and a cylinder block side connecting surface.

8. The engine according to claim 1, wherein the second catalyst is disposed within a second exhaust pipe, which is connected to a second exhaust port of a cylinder head and defines a portion of the second exhaust passage.

9. An engine comprising:
   a cylinder head including at least one combustion chamber surface;
   first, second, and third exhaust valve seats opening in the combustion chamber surface, the third exhaust valve seat being smaller than the first and second exhaust valve seats;
   first, second, and third exhaust valves engaged with the first, second, and third exhaust valve seats;
   first, second, and third exhaust passages extending from the first, second, and third exhaust valve seats, respectively, toward an outer surface of the cylinder head, the third exhaust passage defining an exhaust port opening at the outer surface of the cylinder head, separate from the first and second exhaust passages;
   a first catalyst device including an upstream end communicating with the first and second exhaust passages;
   a second catalyst device including an upstream end communicating with the third exhaust passage but not the first or second exhaust passages;
   a variable valve operating mechanism configured to adjust lifting amounts of the first, second, and third exhaust valves between approximately zero and a maximum lifting amount; and
   a lifting amount control unit configured to control lifting amounts of the first, second, and third exhaust valves with the variable valve operating mechanism such that an exhaust gas amount passing through the third exhaust passage is larger than an exhaust gas amount passing through the first and second exhaust passages, at least during start-up of the engine, and such that the exhaust gas amount passing through the first and second exhaust passages is larger than the exhaust gas amount passing through the third exhaust passage at least in a range of high-speed rotation and large-load operation of the engine after completion of a warm-up operation of the engine.

10. The engine according to claim 9, wherein the second catalyst device is disposed between the first and second exhaust passages.

11. The engine according to claim 9, wherein the first and second exhaust passages merge together to define a Siamese exhaust port.

12. The engine according to claim 11, additionally comprising a cylinder block, the cylinder head including a cylinder block mating surface disposed around the combustion chamber surface, wherein the third exhaust passage is disposed between the Siamese exhaust port and the cylinder block mating surface.

13. The engine according to claim 9, wherein a longitudinal axis of the third exhaust passage is between longitudinal axes of the first and second exhaust passages.

* * * * *